United States Patent [19]

Braconnier

[11] Patent Number: 5,470,503
[45] Date of Patent: Nov. 28, 1995

[54] GRANULAR RARE EARTH PHOSPHATES HAVING CHARACTERISTIC MORPHOLOGY

[75] Inventor: Jean-Jacques Braconnier, Lagord, France

[73] Assignee: Rhone-Poulenc Chimie, Courbevoie Cedex, France

[21] Appl. No.: 98,818

[22] Filed: Jul. 29, 1993

[30] Foreign Application Priority Data

Jul. 29, 1992 [FR] France .................... 92 09356

[51] Int. Cl.$^6$ .......................... C09K 11/83; C01B 25/37; C01B 25/45
[52] U.S. Cl. .................... 252/301.4 P; 423/263
[58] Field of Search .................... 252/301.4 P; 423/263

[56] References Cited

U.S. PATENT DOCUMENTS

| | | | |
|---|---|---|---|
| 3,507,804 | 4/1970 | Ropp | 252/301.4 P |
| 4,423,349 | 12/1983 | Nakajma et al. | 252/301.4 P |
| 5,091,110 | 2/1992 | Fan et al. | 252/301.4 P |

FOREIGN PATENT DOCUMENTS

| | | |
|---|---|---|
| 0456938 | 11/1991 | European Pat. Off. . |
| 0456937 | 11/1991 | European Pat. Off. . |
| 0498689 | 8/1992 | European Pat. Off. . |
| 05240346 | 1/1993 | European Pat. Off. . |
| 865787 | 9/1981 | U.S.S.R. ............ 423/263 |
| WO8204438 | 12/1982 | WIPO . |

OTHER PUBLICATIONS

Ropp I. "J. Electrochem Soc.", vol. 115, No. 5, 1968, no month pp. 531–535.

*Primary Examiner*—Mark L. Bell
*Assistant Examiner*—C. M. Bonner
*Attorney, Agent, or Firm*—Burns, Doane, Swecker & Mathis

[57] ABSTRACT

Monodisperse particulates of a rare earth phosphate having the formula $LnPO_4$ in which Ln is at least one rare earth, the average particle size of which ranging from 1 to 20 microns and preferably from 2 to 6 microns, and having a dispersion index of less than 0.5, preferably less than 0.4, are well suited as luminophors or precursors thereof, and are prepared via precipitation with phosphate ions at a substantially constant pH below 2, from rare earth salt solutions.

29 Claims, No Drawings

GRANULAR RARE EARTH PHOSPHATES HAVING CHARACTERISTIC MORPHOLOGY

CROSS-REFERENCE TO COMPANION APPLICATION

My copending application Ser. No. 08/098,727, filed concurrently herewith and assigned to the assignee hereof.

BACKGROUND OF THE INVENTION

1. Field of the Invention

The present invention relates to the preparation of granular rare earth mixed or simple phosphates having characteristic morphology, optionally containing additives, and to such novel rare earth phosphate particulates, per se.

This invention also relates to the use of the aforesaid novel rare earth phosphate particulates as luminophors and/or matrices for luminophors, or as precursors thereof.

By the term "rare earth(s)" are intended the elements belonging to the lanthanide group of the Periodic Table having an atomic number ranging from 57 to 71, but including yttrium which has an atomic number of 39.

2. Description of the Prior Art

The rare earth mixed or simple phosphates, having the general formula $LnPO_4$ in which Ln represents at least one rare earth, are known useful compounds, in particular by reason of their optical, and more especially luminescence, properties.

Luminescence comprehends that phenomenon, for a product, of emitting electromagnetic waves in a given spectrum under the influence of external monochromatic excitation, which is itself of a given wavelength.

These rare earth phosphates can, moreover, also per se known to this art, optionally contain certain dopants or doping elements (Na, Li, K, Th, B, etc.) as additives for the purpose of promoting and/or further strengthening their luminescence potential.

Among the best known rare earth phosphates in the luminophor field, particularly representative are cerium phosphate, yttrium cerium phosphates, yttrium terbium phosphates and lanthanum cerium terbium phosphates.

Luminophors based on certain of these compounds are today widely used on an industrial scale, in particular in the field of lamps, such as, for example, LaCeTb phosphate.

The syntheses generally described in the literature for the preparation of rare earth mixed or simple orthophosphates may be classified overall in two principal categories, namely: (i) the so-called "dry-treatment" processes and (ii) the so-called "wet-treatment" processes.

The dry-treatment processes entail providing a rare earth oxide or mixture of the oxides of different rare earths, or, alternatively, providing a mixed oxide of said rare earths, and then phosphatizing this oxide or this mixture of oxides or this mixed oxide, by calcining in the presence of diammonium phosphate (solid/solid type reaction).

The wet-treatment processes entail a direct synthesis, in a liquid reaction medium, of a rare earth mixed or simple phosphate, or of a mixture of rare earth phosphates, this typically being carried out by attacking a solid compound containing the rare earth or earths (carbonate and/or oxide) by means of a phosphoric acid solution to precipitate the corresponding phosphates. It will be appreciated that it is also possible to carry out the direct precipitation of the phosphate from a solution of soluble rare earth salts.

Thus, in published French patent application No. 91/01, 215, assigned to the assignee hereof, a process is described for the synthesis of a rare earth mixed phosphate, comprising mixing a solution of soluble lanthanum, cerium and terbium salts with phosphate ions, with control of the pH of the precipitation medium by maintaining same at a constant value above 2, and then permitting the precipitate thereby obtained to age or ripen. Although this process makes it possible, among other advantages, to satisfactorily overcome the filtration problems encountered in the conventional techniques employing direct precipitation (production of gels or precipitates which are very difficult to filter off), it nevertheless yields products whose particle size distribution may be considered to be inadequate, since the dispersion index of the particles of which both the mixed phosphate precursor and the resulting luminophor are comprised is greater 0.5.

The different processes indicated above, whether based on a dry treatment or a wet treatment, present the common major drawback of yielding rare earth phosphates possessing an uncontrolled particle size, especially a particle size distribution which is not narrow or which is, at least, insufficiently narrow. Thus, serious need continues to exist for monodisperse rare earth phosphate particles having uniform and narrowly defined particle size that are useful for the manufacture of efficacious luminophors, namely, luminophors which, on the one hand, are easy to incorporate in lamps or on television screens (coatings in fine, homogeneous layers), and, on the other, exhibit optimal luminescence, in particular brilliance. Indeed, it has now been determined that the quality of the final luminophor for a desired application is essentially and singularly dependent on the quality of the starting phosphate.

SUMMARY OF THE INVENTION

Accordingly, a major object of the present invention is the provision of a simple, economical, reproducible and controllable process for the preparation of novel rare earth mixed or simple phosphates having an improved particle size, and more especially an improved particle size distribution, and which are hence particularly useful as luminophors and/or matrices for luminophors, or as luminophor precursors.

Briefly, the present invention features a unique process for preparing rare earth mixed or simple phosphates of the formula $LnPO_4$ in which Ln represents at least one rare earth, comprising providing a medium of precipitation by introducing, in continuous manner and with stirring, a first solution containing soluble salts of said rare earth or earths into a second solution containing phosphate ions and having an initial pH below 2, controlling the pH of such precipitation medium at a substantially constant value below 2 during the resulting precipitation, then recovering the precipitate thereby obtained and lastly, where appropriate, thermally treating said precipitate.

The present invention also features particulates of the rare earth phosphates of the general formula $LnPO_4$ thus produced, said phosphate particulates having an average particle size ranging from 1 to 20 microns and a dispersion index of less than 0.5.

This invention also features the conversion of the subject rare earth phosphate granules into useful luminophors via appropriate thermal treatment, carried out with or without flux, these luminophors being essentially characterized in that they retain the excellent particle size distribution of the starting phosphates, namely, these too have an average particle size ranging from 1 to 20 microns and a dispersion index of less than 0.5. Such luminophors naturally possess the same composition as their precursors based on rare earth phosphates.

DETAILED DESCRIPTION OF PREFERRED EMBODIMENTS OF THE INVENTION

More particularly according to the present invention, a rare earth mixed or simple phosphate is directly precipitated at a controlled pH, by reacting (i) a first solution containing soluble salts of one or more rare earths, these elements then being present in the requisite stoichiometric proportions for preparing the compound of the desired formula, with (ii) a second solution containing phosphate ions.

In a first essential parameter of the process according to the invention, a certain order of introduction of the reactants must be observed, and, still more specifically, the solution of the soluble salts of the rare earth or earths must be introduced, gradually and continuously, into the solution containing the phosphate ions.

In a second essential parameter of the process of the invention, the initial pH of the solution containing phosphate ions must be below 2, and preferably is at least 1.

In a third essential parameter of the process according to the invention, the pH of the precipitation medium must then be controlled at a pH value below 2, and preferably at a value of at least 1.

By a "controlled pH" is intended maintenance of the pH of the medium of precipitation at a certain constant or substantially constant value by adding basic compounds or buffer solutions to the solution containing the phosphate ions. This is carried out simultaneously with the introduction into the latter solution of the solution containing the soluble rare earth salts. The pH of the medium will thus vary by not more than 0.5 pH unit around the desired set value, and, preferably, by not more than 0.1 pH unit around this value. The desired set value will advantageously correspond to the initial pH (below 2) of the solution containing phosphate ions.

According to the present invention, this control of the pH is advantageously carried out via addition of a basic compound, as will be more fully described below.

The precipitation is preferably carried out in an aqueous medium at a temperature which is not critical and which advantageously ranges from room temperature (15° C.–25° C.) to 100° C. This precipitation takes place while the reaction medium is stirred.

The concentrations of the rare earth salts in the first solution can vary over wide limits. Thus, the total concentration of rare earths advantageously ranges from 0.01 mol/liter to 3 mol/liter.

Suitable rare earth salts for the invention are, in particular, salts which are soluble in an aqueous medium, such as, for example, the nitrates, chlorides, acetates and carboxylates, or admixture thereof. The preferred salts according to the invention are the nitrates.

Particularly exemplary rare earths include yttrium, lanthanum, gadolinium, lutecium, cerium and terbium. Nonetheless, the process according to the invention is suited for the production of any rare earth mixed or simple orthophosphate, to provide a fine and extremely narrowly defined particle size therefor. It will thus be seen that the rare earth phosphates prepared according to the invention are, in particular, those indicated above.

It should be appreciated that the solution of the rare earth salts can comprise, in addition, other metal salts such as, for example, salts of alkali metals, of thorium, of boron, and the like, for the purpose of obtaining rare earth phosphates doped with such other elements, as is known to this art for promoting the luminescence properties of the final phosphate.

The phosphate ions which are reacted with the solution of the rare earth salts may be provided by pure compounds, or compounds in solution, such as, for example, phosphoric acid, alkali metal phosphates or the phosphates of other metallic elements providing a soluble compound with the anions associated with the rare earths.

In a preferred embodiment of the invention, the phosphate ions are added in the form of ammonium phosphates, since the ammonium cation will decompose during the subsequent calcining, thereby enabling a rare earth phosphate of very high purity to be obtained. Among the ammonium phosphates, diammonium and monoammonium phosphates are the preferred compounds for carrying out the process of the invention.

The phosphate ions are present in an amount such that there exists a $PO_4/Ln$ mole ratio of greater than 1, and advantageously ranging from 1.1 to 3, between the two solutions.

As emphasized above, the solution containing the phosphate ions must initially (i.e., prior to the start of introduction of the solution of rare earth salts) possess a pH below 2, and preferably of at least 1. Thus, if the solution used does not naturally possess such a pH, the pH is adjusted to the desired appropriate value either by adding a base (for example ammonia solution, in the case of an initial solution of phosphoric acid), or by adding an acid (for example nitric acid, in the case of an initial solution of diammonium phosphate).

Thereafter, during the introduction of the solution containing the rare earth salt or salts, the pH of the precipitation medium gradually decreases. Thus, according to one of the essential parameters of the process according to the invention, with the object of maintaining the pH of the precipitation medium at the desired constant working value, which must be below 2 and preferably is at least 1, a base is introduced simultaneously into this medium.

Suitable basic compounds according to the invention include metal hydroxides (NaOH, KOH, $Ca(OH)_2$, etc.) or ammonium hydroxide, or any other basic compound whose constituent species will not form any precipitate when they are added to the reaction medium, by combination with one of the species additionally contained in this medium, and which permits control of the pH of the medium of precipitation.

In another preferred embodiment of the invention, this basic compound is advantageously a compound that can readily be removed, either with the liquid phase of the reaction medium and washing of the precipitate, or by thermal decomposition during the calcining of the phosphate.

Thus, the preferred basic compound of the invention is ammonia, advantageously employed in the form of aqueous solution thereof.

At the end of the precipitation step, a rare earth mixed or simple phosphate, optionally containing other additive elements, is obtained directly. The overall concentration of rare earths in the final precipitation medium is then advantageously greater than 0.25 mol/liter. The phosphate precipitate may be recovered by any means known per se, especially by simple filtration. Indeed, under the conditions of the process of the invention, a non-gelatinous rare earth phosphate that can readily by filtered off is precipitated. The product recovered can then be washed, for example with water, to remove any impurities therefrom, in particular adsorbed nitrate and/or ammonium functions.

Finally, it can be thermally treated, under various conditions selected essentially dependent on the degree of conversion desired for the final product (nature of the crystalline phase, degree of hydration, purity, level of luminescence, and the like), as will be more fully described below. Whether or not subsequent thermal treatments are carried out, it should be appreciated that the process of the invention always yields granular or particulate products possessing a fine and extremely narrowly defined particle size.

The novel rare earth phosphate particulates of the present invention will now be more fully described.

The rare earth mixed or simple phosphates according to the invention, in particulate state, have the general formula:

$$LnPO_4$$

in which Ln is at least one rare earth, and the particles of which have an average size ranging from 1 to 20 microns, preferably from 2 to 6 microns, with a dispersion index of less than 0.5, and preferably less than 0.4.

The particles exhibit a size distribution which is both monodisperse and extremely narrowly defined around the average value, a result hitherto unknown to this art.

In the above formula, it will be appreciated that the Ln/PO$_4$ mole ratio is always equal to 1; in particular, for phosphates of the mixed type, it is the mole ratio of the sum of all the rare earths present to phosphate which must equal to 1. For example, a lanthanum cerium phosphate will have the formula:

$$[La_xCe_{(1-x)}]PO_4.$$

The average diameter of the particles is measured using a CILAS type laser granulometer (CILAS HR 850).

The dispersion index I is, for its part, determined by the formula:

$$I = \frac{\phi_{84} - \phi_{16}}{2\phi_{50}}$$

in which $\phi_{84}$ is the particle diameter for which 84% of the particles have a diameter less than $\phi_{84}$; $\phi_{16}$ is the particle diameter for which 16% of the particles have a diameter less than $\phi_{16}$; and $\phi_{50}$ is the average diameter of the particles.

These rare earth orthophosphates can display a crystalline form of either the hexagonal or the monoclinic type, essentially in accordance with the temperature "experienced" by the products during their preparation.

Thus, more specifically, the hexagonal state corresponds to phosphates which have either been subjected to no subsequent thermal treatment (for example a crude precipitation product), or indeed subjected to a thermal treatment, but at a temperature generally not exceeding 600° C. The monoclinic state corresponds to mixed phosphates which are obtained after an elaborate thermal treatment carried out at a temperature at least above 600° C., and advantageously ranging from 700° C. to 1,000° C., for purposes of effecting conversion of the hexagonal crystalline phase into a pure monoclinic phase.

A product which has not been thermally treated is generally hydrated; however, simple drying operations performed, for example, at from 60° to 100° C. suffice to remove the larger fraction of this residual water and to provide substantially anhydrous rare earth phosphates, the minor amounts of remaining water being, for their part, removed by calcining operations conducted at higher temperatures above approximately 400° C.

Depending on the temperatures at which they have been calcined, the phosphates according to the invention can contain larger or smaller residual amounts of ammonium ions. Thus, before calcining or after calcining at a temperature below 500° C., they generally contain not more than 5% by weight of ammonium ions, and preferably not more than 2% by weight thereof. In all cases, these ammonium ions may be removed by thermal decomposition or evaporation during calcining operations carried out at higher temperatures, especially above 600° C.

Similarly, the rare earth phosphates of the invention possess specific surface areas which vary according to the calcining temperatures to which they have been subjected, these specific surfaces decreasing steadily with these temperatures. Thus, as one example, after thermal treatment at a temperature below 600° C., the phosphates possess a specific surface area of not less than 30 m$^2$/g; after calcining at 800° C., this surface area is on the order of around ten m2/g, approximately, and, after calcining at 900°–1,000° C., it decreases to values generally below approximately 5 m$^2$/g.

Such specific surface area is measured by the BET method, being determined by adsorption of nitrogen according to ASTM Standard D3663-78 established on the basis of the BRUNAUER/EMMETT/TELLER technique described in *Journal of the American Chemical Society,* 60,309 (1938).

The rare earth phosphates of the invention exhibit, in addition, the especially notable and advantageous property of not caking during calcining, namely, the particles of which are not, or do not tend to be, aglommerated, and hence do not tend to develop in a final form of large granules from 0.1 to several mm, for example, in size. It is thus not required to carry out a preliminary grinding of the powders before they are subjected to the conventional treatments for producing the final luminophor.

Lastly, as indicated above, the rare earth phosphates according to the invention can also comprise other elements that conventionally serve, in particular, as promoters of luminescence or as stabilizers of the oxidation states of the different rare earth elements. Exemplary thereof are, more especially, alkali metals (Li, Na, K, etc.), thorium and boron.

Although the rare earth phosphates of the invention display, after being subjected to a thermal treatment at a temperature generally above 600° C., and advantageously ranging from 700° to 1,000° C., luminenscence at wavelengths which vary according to the composition of the product and after exposure to radiation of a given wavelength, it may prove necessary to further improve these properties of luminenscence via post-treatment of the products to provide a true luminophor which is directly usable, as such, in the desired final application. Of course, the dividing line between a simple rare earth phosphate and a true luminophor remains, on final analysis, rather arbitrary, and depends only on the luminenscence threshold from which a product is considered to be directly acceptable by the end user. In the present case, rather generally, the rare earth phosphates according to the invention which have not been subjected to thermal treatments above approximately 1,000° C. may be regarded and identified as luminophor precursors, since such products generally possess luminenscence properties which may be judged as not satisfying the minimum criterion of brilliance of commercial luminophors capable of being used directly, as such, without any subsequent conversion. Conversely, the rare earth phosphates which, after being subjected, where appropriate, to suitable treatments, develop appropriate brilliance which is sufficient for them to be used directly, for example in lamps or television screens, may be qualified as luminophors.

Thus, to further develop their luminenscence, the rare earth phosphates of the invention (precursors) may be subjected to a thermal treatment using a "flux". It will be appreciated that such a treatment is itself well known to this art, and is traditionally used in the processing of the principal luminophors, in particular for adapting the latter to the desired application (morphology of the particles, surface state, brilliance, for example).

Suitable such fluxes include, in particular, lithium fluoride, lithium chloride, potassium chlorides ammonium chlorides boron oxide and ammonium phosphates, etc. The flux is mixed with the mixed phosphate to be treated, and the mixture is then heated to a temperature above 1,000° C., generally ranging from 1,000° C. to 1,200° C. under a necessarily reducing atmosphere. After treatment, the product is washed and then rinsed to obtain the purest possible luminophor in a non-agglomerated state.

In other instances, depending on the composition of the phosphates, the products may be simply treated thermally in the absence of any flux at a temperature above 1,000° C., and generally ranging from 1,000° to 1,200° C.

Regardless of which of the above techniques is employed, a luminophor based on a rare earth phosphate is always obtained, of crystalline structure of the monoclinic type, having an average particle size ranging from 1 to 20 microns, and preferably from 2 to 6 microns, and exhibiting a very low dispersion index, of less than 0.5 and preferably less than 0.4.

The average particle size and the dispersion index of the particles are determined according to the methods described above.

In order to further illustrate the present invention and the advantages thereof, the following specific examples are given, it being understood that same are intended only as illustrative and in nowise limitative.

EXAMPLE 1

500 ml of an aqueous solution of praseodymium nitrate, the concentration of which was equal to 1.5 mol/l of praseodymium, were added over the course of one hour to 500 ml of an aqueous solution of phosphoric acid $H_3PO_4$ previously adjusted to pH 1.4 by adding ammonia solution and heated to 60° C., to effect the precipitation thereof.

The phosphate/Pr mole ratio was 1.15. The pH during the precipitation was adjusted to 1.5 by adding ammonia solution.

At the end of the precipitation step, the reaction medium was maintained for one additional hour at 60° C.

The precipitate was then readily recovered by filtration, washed with water and thereafter dried at 60° C. in air. The product then was in the form of a green powder (apparent texture resembling that of a talc) of 1- to 3-micron particles (agglomerates) composed of compact, approximately 250-nm aggregates, which were themselves formed by aggregation of elementary crystallites between 30 and 150 nm in size. The powder was then treated at 900° C. in air.

X-ray analysis evidenced that the product was a praseodymium orthophosphate of monoclinic crystalline structure. It comprised compact, approximately 250-nm grains agglomerated in the form of spherical particles ranging from 1 to 3 microns in size. CILAS granulometry, measured after brief disintegration of the agglomerates by means of ultrasound, provided a $\phi_{50}$ of 2.5 microns with a very narrow distribution, since the dispersion index was less than 0.5.

EXAMPLE 2

An aqueous solution of yttrium nitrates of concentration equal to 0.5 mol/l was added over the course of one hour to an aqueous solution of monoammonium phosphate acidified to pH 1.5 by adding nitric acid and heated to 60° C. The $PO_4/Y$ mole ratio was 1.1, and the pH during the precipitation was adjusted to 1.8 by adding aqueous ammonia solution. At the end of the precipitation step, the reaction medium was maintained for one additional hour at 60° C.

The precipitate was then readily recovered by filtration and thereafter washed with water. It was in the form of a white powder (appearance of a talc) corresponding to a hydrated yttrium orthophosphate of hexagonal crystalline structure. Its volatile matter content was approximately 77% by weight.

The precipitate was subjected to a thermal treatment at 900° C. in air. This calcining provided a fine, white powder of composition corresponding to an yttrium orthophosphate, with a monoclinic crystalline structure, and comprising 5- to 15-micron agglomerates. CILAS granulometry, measured after brief disintegration of the agglomerates of the product by means of ultrasound, provided a $\phi$50 of 10 microns with a very narrow distribution, since the dispersion index was less than 0.5.

EXAMPLE 3

500 ml of an aqueous solution of rare earth nitrates of overall concentration 1.5 mol/l, and constituted as follows: 0.825 mol/l of $La(NO_3)_3$; 0.45 mol/l of $Ce(O_3)_3$ and 0.225 mol/l of $Tb(O_3)_3$, were added over the course of one hour to 500 ml of an aqueous solution of phosphoric acid $H_3PO_4$ previously adjusted to pH 1.4 by adding ammonia solution and heated to 60° C., to effect the precipitation thereof.

The phosphate/rare earths mole ratio was 1.15. The pH during the precipitation was adjusted to 1.4 by adding aqueous ammonia solution.

At the end of the precipitation step, the reaction medium was maintained for one additional hour at 60° C.

The precipitate was then readily recovered by filtration, washed with water and thereafter dried at 60° C. in air. The product then was in the form of a white powder (appearance of a talc) comprising 3- to 6-micron particles (agglomerates) composed of compact, approximately 250-nm aggregates, which themselves were formed by aggregation of elementary crystallites ranging from 30 to 150 nm in size. The powder was then thermally treated at 900° C. in air.

X-ray analysis evidenced that the product was an LaCeTb orthophosphate of monoclinic crystalline structure. It comprised compact, approximately 250-nm grains agglomerated in the form of spherical particles ranging from 3 to 6 microns in size. CILAS granulometry, measured after brief disintegration of the agglomerates by means of ultrasound, provided a $\phi_{50}$ of 4.5 microns with a very narrow distribution, since the dispersion index was less than 0.4.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. Monodisperse particulates of a rare earth phosphate having the formula $LnPO_4$ in which Ln is at least one rare earth, the average particle size of which is within a range from 1 to 10 microns and having a dispersion index of less than 0.5.

2. The monodisperse particulates as defined by claim 1, having an average particle size in a range from 2 to 6 microns.

3. The monodisperse particulates as defined by claim 1, having a dispersion index of less than 0.4.

4. The monodisperse particulates as defined by claim 1, in anhydrous state.

5. The monodisperse particulates as defined by claim 1, in hexagonal crystalline state.

6. The monodisperse particulates as defined by claim 1, in monoclinic crystalline state.

7. The monodisperse particulates as defined by claim 1, comprising less than 5% by weight of ammonium ions.

8. The monodisperse particulates as defined by claim 7, comprising less than 2% by weight of ammonium ions.

9. The monodisperse particulates as defined by claim 1, comprising at least one luminescence-enhancing dopant in an amount effective for enhancing luminescence.

10. The monodisperse particulates as defined by claim 1, comprising a cerium phosphate, a yttrium/cerium phosphate, a yttrium/terbium phosphate or a lanthanum/cerium/terbium phosphate.

11. The monodisperse particulates as defined by claim 1, having a specific surface of at least 30 $m^2/g$.

12. The monodisperse particulates as defined by claim 1, having a specific surface on the order of 10 $m^2/g$.

13. The monodisperse particulates as defined by claim 1, having a specific surface no greater than about 5 $m^2/g$.

14. A process for the preparation of the monodisperse particulates as defined by claim 1, comprising continuously introducing, under stirring, a first solution which comprises at least one soluble salt of said at least one rare earth Ln, into a second solution which comprises phosphate ions and has an initial pH below 2, whereby precipitating $LnPO_4$ particles therefrom, controlling the pH of the medium of precipitation by adding a basic compound or buffer solution to said medium of precipitation thus formed at a substantially constant value below 2 during said precipitation, and then recovering and optionally thermally treating the precipitate thus obtained at a temperature sufficient to achieve a different crystalline state.

15. The process as defined by claim 14, said initial pH being not less than 1.

16. The process as defined by claim 15, comprising controlling said pH at a value of not less than 1.

17. The process as defined by claim 14, said initial pH and said substantially constant pH being about the same.

18. The process as defined by claim 14, comprising controlling said pH by adding a basic compound to the medium of precipitation.

19. The process as defined by claim 18, said basic compound comprising ammonium hydroxide.

20. The process as defined by claim 14, said second solution comprising a solution of at least one ammonium phosphate.

21. The process as defined by claim 14, said second solution comprising a solution of phosphoric acid.

22. The process as defined by claim 14, said first solution comprising from 0.25 mol/liter to 3 mol/liter of said at least one rare earth Ln.

23. The process as defined by claim 14, said at least one soluble salt of said at least one rare earth Ln comprising a nitrate, chloride, acetate, carboxylate, or mixture thereof.

24. The process as defined by claim 23, said at least one soluble salt comprising a nitrate.

25. The process as defined by claim 14, said first and said second solutions comprising aqueous solutions.

26. The process as defined by claim 14, said first solution further comprising a luminescence-enhancing dopant in an amount effective for enhancing the luminescence of the rare earth phosphate thus produced.

27. The process as defined by claim 14, comprising thermally treating the precipitate thus obtained at a temperature exceeding 1,000° C.

28. A luminophor comprising monodisperse particulates of a rare earth phosphate having the formula $LnPO_4$ in which Ln is at least one rare earth, the average particle size of which is within a range from 1 to 20 microns and having a dispersion index of less than 0.5.

29. A luminophor precursor comprising the monodisperse particulates as defined by claim 1.

* * * * *